United States Patent [19]
Ainsworth

[11] Patent Number: 6,088,245
[45] Date of Patent: Jul. 11, 2000

[54] SWITCHING CONTROL ARRANGEMENT

[75] Inventor: John Desmond Ainsworth, Staffordshire, United Kingdom

[73] Assignee: GEC Alsthom Limited, United Kingdom

[21] Appl. No.: 09/124,384

[22] Filed: Jul. 28, 1998

[30] Foreign Application Priority Data

Jul. 29, 1997 [GB] United Kingdom ................... 9715940

[51] Int. Cl.[7] .................................................. H02M 1/12
[52] U.S. Cl. .................................. 363/39; 363/40; 363/98
[58] Field of Search .................................. 363/39, 40, 41, 363/98; 323/208, 209, 119; 307/105

[56] References Cited

U.S. PATENT DOCUMENTS

| | | | |
|---|---|---|---|
| 4,599,685 | 7/1986 | Hombu et al. | 363/41 |
| 4,775,924 | 10/1988 | Sweezy | 363/51 |
| 4,800,478 | 1/1989 | Takahashi . | |
| 5,343,139 | 8/1994 | Gyugyi et al. . | |
| 5,532,575 | 7/1996 | Ainsworth et al. | 323/211 |
| 5,751,138 | 5/1998 | Venkata et al. | 323/207 |

FOREIGN PATENT DOCUMENTS

| | | |
|---|---|---|
| 0 077 625 A1 | 4/1983 | European Pat. Off. . |
| 0 152 796 A1 | 8/1985 | European Pat. Off. . |
| 0 300 343 A2 | 1/1989 | European Pat. Off. . |
| 2 285 523 | 7/1995 | United Kingdom . |
| 2 294 821 | 5/1996 | United Kingdom . |
| WO 96/16469 | 5/1996 | WIPO . |

*Primary Examiner*—Shawn Riley
*Assistant Examiner*—Rajnikant P. Patel
*Attorney, Agent, or Firm*—Kirschstein, et al.

[57] ABSTRACT

A switching control arrangement for a multilevel convertor minimizes the harmonic content of the converter voltage or current by an open-loop and/or a closed-loop control of the timing of the switching of the GTOs associated with the energy-storage components (e.g. capacitors) in the convertor. In a first open-loop arrangement the convertor current is quantized over its working range and different threshold values are provided in dependence on the quantization values of the current. In a second open-loop arrangement a continuous, non-quantized control is provided based on at least a quadratic approximation to the desired current-dependent behavior of the GTO switching angles. In a third, closed-loop arrangement, different GTO-switching threshold levels are provided as controlled by a Fourier integration process involving the nulling of those harmonics desired to be nulled. The control arrangement is applicable to chain or stacked-capacitor multilevel convertors and can be employed in SVC applications or applications in which the convertor draws real power as well as reactive power.

29 Claims, 10 Drawing Sheets

SWITCHING CONTROL ARRANGEMENT

BACKGROUND OF THE INVENTION

The invention concerns a switching control arrangement for a multilevel convertor, in particular, but not exclusively, a chain-circuit multilevel convertor.

Figure 1:
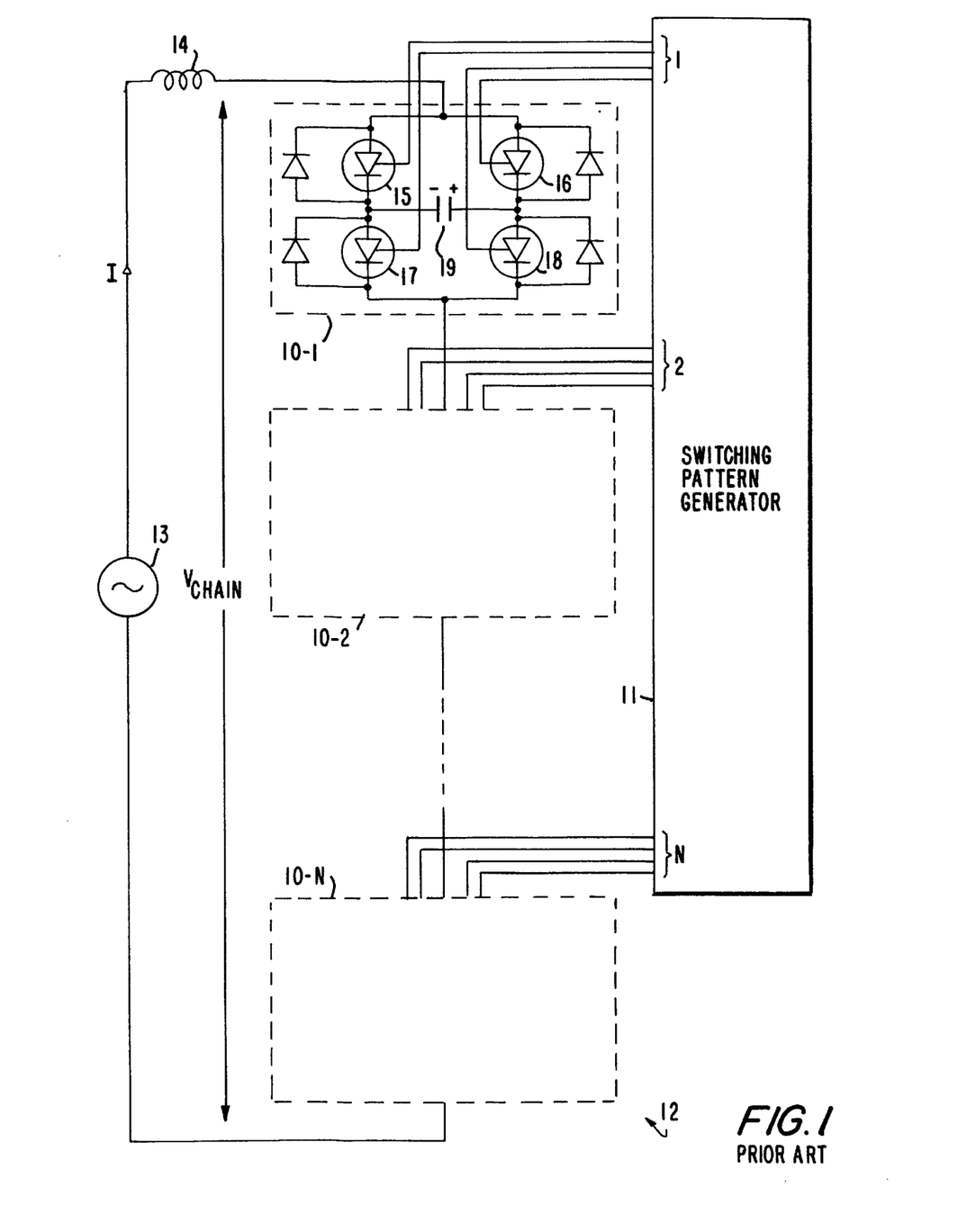
FIG. 1 is a schematic diagram of a multilevel chain circuit interfaced with an AC power system according to the prior art.

The chain-circuit is illustrated in FIG. 1. This includes a number (defined as N, where N will be typically 6 or more) similar 'links' 10 connected in series on their AC sides to form a complete chain 12. As shown, the chain is connected to an AC power system 13 via an inductor 14. One link is shown in detail and includes four electronic switches 15 to 18. For high equipment ratings, for example 20 MVA or more, the principal component in each electronic switch may be a gate turn-off thyristor (GTO) with a reverse parallel-connected diode as shown and this will be generally assumed for reference here; the alternative use of transistors of various types is also possible, particularly at lower ratings.

The electronic switches in each link form a voltage-commutated convertor. As shown in FIG. 1, this commutates against a capacitor 19 on its DC side and the circuit is then suitable for use as a Static VAr Compensator (SVC) for the supply of positive or negative controllable reactive power (VAr) to the AC system; the general description will center around this application of the multilevel convertor, although, as mentioned later, other applications are possible within the context of the invention.

First, it is assumed that the DC capacitors are of high capacitance. For a particular link, assuming that its capacitor has a voltage $V_{DC}$ and ignoring any AC ripple on the capacitor for the present, the voltage on the AC side of the link in FIG. 1 may be set to values of:

| | |
|---|---|
| $+V_{DC}$ | if switches 16, 17 only are turned on |
| 0 | if switches 15, 17 (or 16, 18 only are turned on |
| $-V_{DC}$ | if switches 15, 18 only are turned on |

Figure 2:
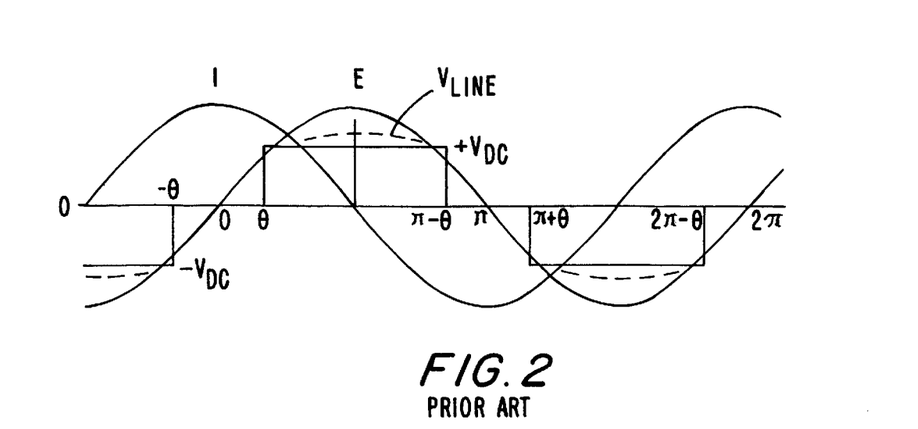
FIG. 2 is a waveform diagram showing waveforms of various electrical parameters relating to the known arrangement of FIG. 1.

By suitably controlling the timing of the switchings within each fundamental- frequency cycle of the AC system by way of the switching pattern generating means 11, the AC voltage $V_{LINK}$ of one link, as defined in FIG. 1, may then be made as in FIG. 2 (ignoring the dashed lines for the present), in which the switching times are shown as $\theta$, $\pi-\theta$, $\pi+\theta$ and $2\pi-\theta$ electrical radians within one cycle. The angle $\theta$ is defined as the "characteristic angle" of the link; its value will generally be different for each link.

This forms a symmetrical waveform, having a fundamental frequency and odd harmonics only. The total AC voltage $V_{CHAIN}$ of the chain will be the summation of the AC voltages of each link, giving a 'stepped' waveform similar to that shown in FIG. 3, which is for a 6-link chain.

Figure 3:
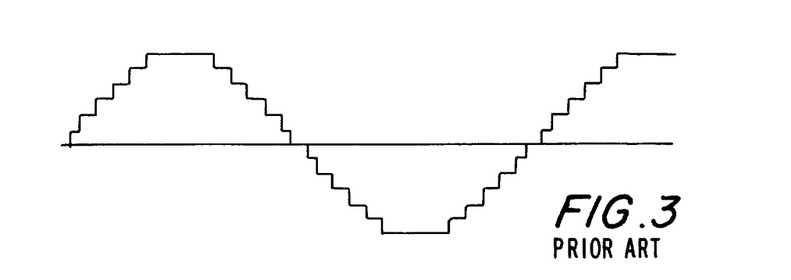
FIG. 3 is a waveform diagram showing the output of a known 6-link chain circuit.

It will be clear from FIG. 3 that by suitable selection of the N characteristic switching angles $\theta_1$ to $\theta_N$ (for an N-link chain) the stepped waveform can be arranged to be a close approximation to a fundamental-frequency sine wave. Angles may be chosen so as to null selected harmonics (such as orders 5, 7, 11, 13, . . . ) or to give a least-error fit to a reference sine wave.

Figure 4A:
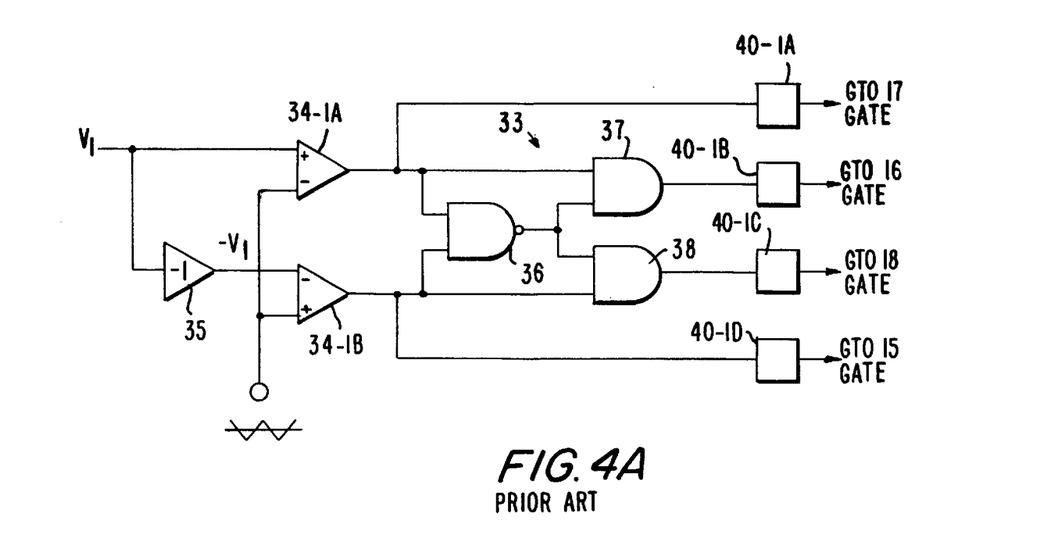
FIG. 4A is a circuit diagram of a possible analogue switching control system for one link of the known chain circuit of FIG. 1, and FIGS. 4B and 4C are analogue and digital realizations, respectively, of a possible switching control system for a whole multilevel convertor such as the known chain circuit of FIG. 1.

It is known to construct an analogue form of control for this or similar circuits in which a common reference sine waveform or symmetrical saw-tooth waveform is applied to a set of comparators to generate the desired gate waveforms for the switches (GTOs) in each convertor. FIG. 4A shows a possible arrangement for one link, for example link 10-1. In this, a fixed DC voltage $V_1$ is applied to one input of a comparator 34-1A and, via an inverting amplifier 35, to one input of a second comparator 34-1B. To both second inputs of the comparators 34-1A and 34-1B is taken a common reference waveform, in this example a symmetrical triangular waveform.

Comparator 34-1B is oppositely configured at its input compared with comparator 34-1A, such that the outputs of the two comparators go logic LOW when the absolute value of the reference sawtooth voltage exceeds that of the voltage $V_1$—$V_1$ applied to the comparators.

The comparators supply four coupling-isolator means 40-1A, 40-1B, 40-1C and 40-1D, which may, for example take the form of optical fibres and amplifiers, and these coupling means in turn feed the gates of switches 17, 16, 18 and 15, respectively. Coupling means 40-1B and 40-1C are fed indirectly by way of a logic circuit 33 comprising a NAND-gate 36 and two AND gates 37, 38 connected as shown. In this particular arrangement the GTOs are driven into conduction by a LOW signal on the comparator outputs, the coupling means normally then delivering a HIGH output to interface with the actual GTO gates.

By suitable choice of $V_1$ gate, waveforms are produced which correspond to the desired rectangular link waveform $V_{LINK}$ shown in FIG. 2, except that all pulses are unipolar for driving the GTOs. The purpose of the logic circuit 33 is to ensure that, during those times when the link voltage is zero, the appropriate pair of GTOs (in this case, GTOs 16 and 18) is switched on to form an effective short-circuit. The respective switching angles in each cycle inherently form the required pattern ($\theta_1$, $\pi-\theta_1$, $\pi+\theta_1$, $2\pi-\theta_1$, etc.). Thus the value of the characteristic angle $\theta_1$, for link reference 1 is determined by suitable choice of $V_1$.

Figure 4B:
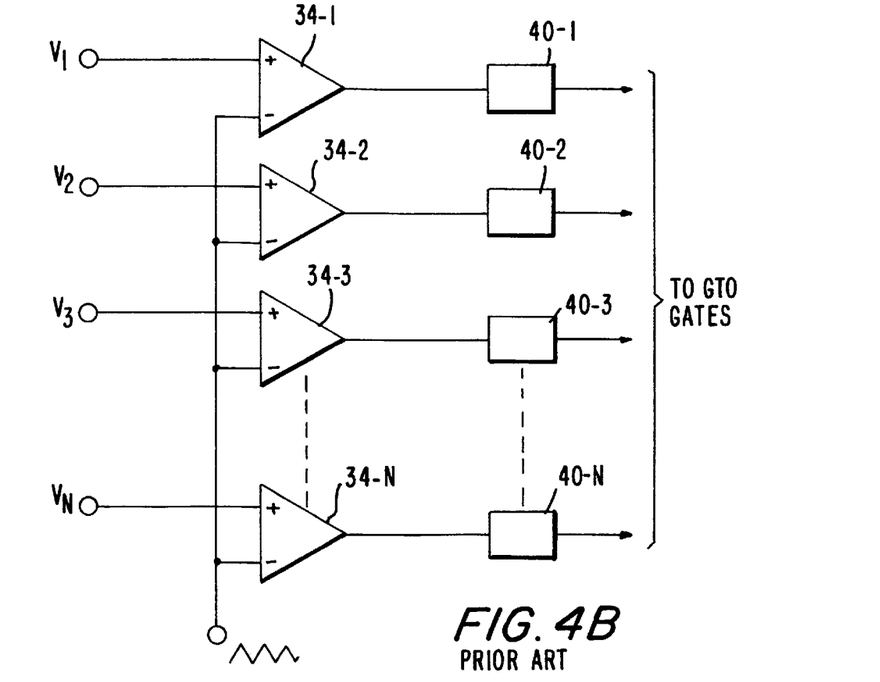

For the other links, similar comparators, logic gates and output coupling/isolator means may be used, but their fixed input voltages $V_2$, $V_3$, etc are chosen appropriately to produce the different characteristic angles $\theta_2$, $\theta_3$, etc. FIG. 4B shows the general arrangement, except that for simplicity the group of comparator and isolator means for each link is shown as a single comparator and isolator only, such as 34-1 and 40-1, respectively, and the logic circuit 33 is omitted. It should be realized, however, that the omitted components would, in practice, be included.

Figure 4C:
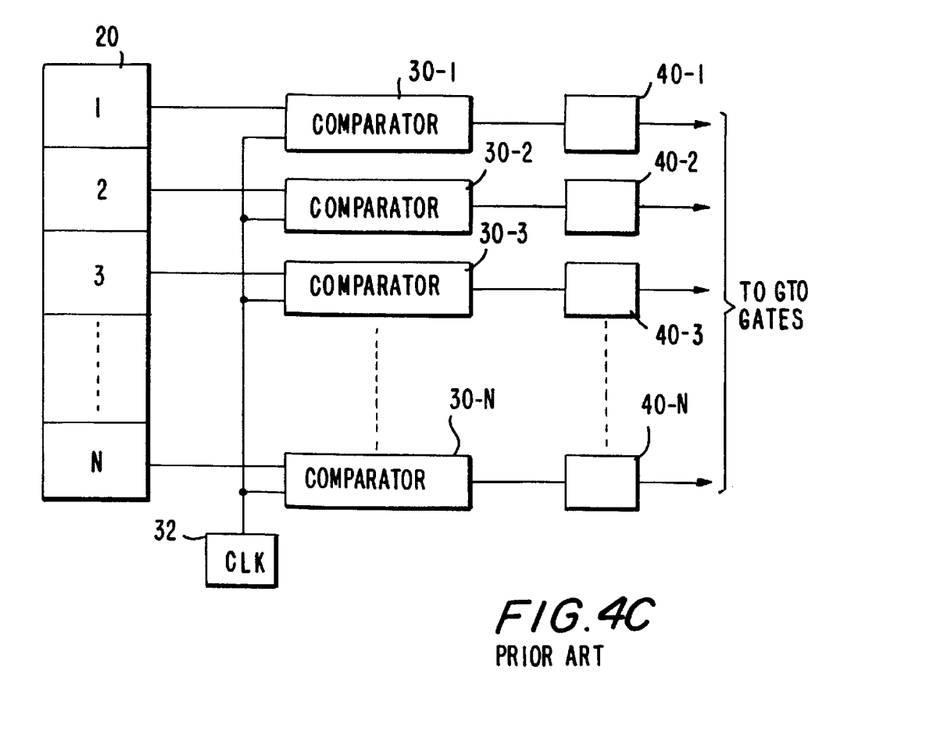

FIG. 4C shows a digital equivalent in which a digital look-up table 20 replaces the set of voltages $V_1$, $V_2$ . . . $V_N$ and contains N locations each occupied by a number corresponding to a particular threshold value. Digital comparators 30-1 to 30-N replace analogue comparators 34-1 to 34-N and their outputs are taken to the GTO gates via respective coupling/isolating means 40-1 to 40-N. The comparators are controlled by a digital clock, in the form of a digital number increasing progressively from, for example, zero to 4096 in steps of 1, then falling similarly back to zero and repeating synchronously with the AC system frequency, thereby replacing the analogue triangular reference waveform of FIG. 4A. FIG. 4C is again simplified in a similar manner to FIG. 4B and in reality contains four comparators and coupling means, and a logic circuit, for each chain link, generally as FIG. 4B.

A main control system will normally be used to move the entire switching pattern "en masse" in phase relative to the AC system voltage in response to the deviation of a measured quantity (such as fundamental-frequency current) from a desired value, in a closed loop to tend to reduce the deviation to zero. Since this is not a part of the present invention it will not be further discussed in this specification.

As described above, capacitor voltages are assumed to be ripple-free and only one switching pattern is therefore required since, while the amplitude of the waveform in FIG. 3 may naturally change with working conditions (fundamental-frequency voltage and current) the shape is not required to do so. In practice this is too simplistic, since it implies capacitors of infinite capacitance.

In a practical AC system substantial AC current will flow and this current will flow in each capacitor for parts of each cycle. Since capacitors have to be limited by physical size and cost, substantial ripple will appear on each capacitor added to its basic DC voltage. The effect on the AC voltage of one link is shown by the dashed lines in FIG. 2; the effects on the chain voltage of FIG. 3 are to replace the horizontal parts of the waveform by curved portions (not shown). There will be a substantial change in the fundamental voltage of the chain and this will be automatically compensated for by the main control system; however, if the switching pattern is unchanged there will also be large (and usually unacceptable) increases in the harmonic voltages generated by the chain (or the accuracy of the least-error fit to a sine wave, where this is selected as the criterion, will be severely impaired).

The present invention addresses the problem of harmonic corruption occurring during changing current-load conditions.

SUMMARY OF THE INVENTION

In accordance with a first aspect of the invention, there is provided a switching- control arrangement for a multilevel convertor, said convertor having a plurality of DC-sink/source means, a plurality of switching devices associated with said DC-sink/source means, and a switching-pattern generating means, said switching-pattern generating means being configured to switch said switching devices in a predetermined switching pattern such as to yield at an output of the convertor a multilevel electrical signal for connection to an AC power system with which said convertor is to be used, wherein said switching-control arrangement comprises a means for modifying said switching pattern such as to minimize an undesired harmonic content of an electrical quantity associated with said convertor or with said AC power system.

The switching-pattern modifying means may comprise means for modifying a timing of the switching of said switching devices.

The predetermined switching pattern may correspond to a predetermined fraction of the amplitude of the fundamental-frequency component of convertor output current and said timing-modifying means may be arranged to modify said timing in dependence on a value of said fundamental-frequency current amplitude relative to said predetermined fraction.

The switching-pattern generating means may have N outputs for application to said switching devices and said timing-modifying means may comprise a means for quantizing a range of the convertor output current into M different levels, said switching-control arrangement comprising also a means for providing M×N switching-threshold values, said threshold-value providing means being connected to said quantizing means such that, for a particular value of convertor current, a particular one of M sets of N threshold values is selected, said particular set of threshold values causing said switching devices to be switched such as to give rise to a minimum level of harmonic distortion in said convertor output voltage.

The quantizing means may comprise a means for forming a signal corresponding to a product of a voltage across said multilevel convertor and a current flowing through said multilevel convertor. The quantizing means may also comprise a phase-shifting means for shifting one of said multilevel convertor voltage ($V_{CH}$) and current (I) by 90° prior to the formation of said product. The quantizing means may further comprise a means for dividing said product by a signal representative of said multilevel-convertor voltage.

The phase-shifting means may be arranged to phase-shift said signal representative of said convertor voltage by 90° and said product-dividing means may be arranged to divide said product by said signal representative of said convertor voltage.

The switching-pattern generating means may have N outputs (40) for coupling to said switching devices and said timing-modifying means may comprise a means for deriving a signal representative of a current flowing through said multilevel convertor and a means, connected to said means for deriving a signal representative of convertor current and coupled to said switching devices, for controlling a switching angle associated with each of said N outputs in accordance with the following expression:

$$\theta_n = \theta_{0n} + \sum_{i=1}^{q} P_{ni}(I')^i \qquad (1)$$

where $2 \leq q \leq 4$

---

$\theta_n$ = switching angle of link n, $1 \leq n \leq N$
$\theta_{0n}$ = switching angle at zero current,
$P_n$ = constant, and
$I'$ = a signal representative of a fundamental-frequency amplitude of said multilevel-convertor current.

---

There may be provided a means for providing signals representative of said parameters $\theta_{0n}$ and $P_{ni}$ for each of said N outputs.

The means for deriving a signal representative of convertor current may comprise a means for forming a signal corresponding to a product of a voltage across said multilevel convertor and a current flowing through said multilevel convertor.

The means for deriving a signal representative of convertor current may comprise also a phase-shifting means for shifting one of the convertor voltage ($V_{CH}$) and convertor current (I) signals by 90° prior to the formation of said product. Said means for deriving a signal representative of convertor current may further comprises a means for dividing said product by the multilevel-convertor voltage signal ($V_{CH}$), the output of said dividing means being taken to an input of said switching-angle controlling means.

The switching-angle controlling means preferably controls a switching angle associated with each of said N outputs in accordance with the quadratic expression:

$$\theta_n = \theta_{0n} + a_n I' + b_n I'^2$$

where a and b are constants and $1 \leq n \leq N$.

The switching-angle controlling means may comprises first and second multipliers and an adder, first inputs of said first and second multipliers being connected to respective outputs of said parameter-signal providing means which provide said a and b constants, respectively, second inputs of said first and second multipliers being respectively connected to the output of said means for deriving a signal representative of convertor current and to an output of a means for forming a square of the signal on said output of means for deriving a signal representative of convertor current, respective outputs of said first and second multipliers being taken along with an output of said parameter-signal providing means which provides said $\theta_0$ parameter to respective inputs of said adder, an output of said adder being used to drive the respective switching-device stage.

In addition to, or in place of, the open-loop switching-control arrangements so far described, there may be provided a closed-loop switching-angle control means.

The closed-loop switching-angle control means may comprise a means for nulling individual harmonics of said electrical quantity associated with said convertor or with said AC power system. The nulling means may comprise a harmonic modulation vector means for providing, for respective ones of said N outputs, switching-threshold values relating to respective harmonics to be nulled, a means for providing a signal representative of a magnitude of respective said harmonics to be nulled, and combining means connected to said harmonic modulation vector means and to said magnitude-signal providing means for combining respective harmonic-magnitude signals with respective harmonic switching-threshold values, thereby to provide respective N output signals for coupling to said switching devices. The combining means may be third multipliers.

The magnitude-signal providing means may comprise a plurality of reference-frequency generators ($f_{REF3}$, $f_{REF5}$, $f_{REF7}$) for respective harmonics to be nulled, the frequency of each generator being the same as the frequency to be nulled, a plurality of fourth multipliers associated with respective harmonics to be nulled, said fourth multipliers each having first and second inputs connected to, respectively, an output of a respective said reference-frequency generator and a signal representative of said electrical quantity, and an output connected to an integrator, an output of said integrator forming an output of said magnitude-signal providing means.

Where both open- and closed-loop control is required, an output of each of said third multipliers may be additively combined with a relevant output of said means for providing M×N switching-threshold values. Alternatively, an output of each of said third multipliers may be additively combined with an output of the relevant switching-angle controlling means.

It is possible for a transfer of real power to take place between the multilevel convertor and the AC power system. In that case, the timing-modifying means may comprise a further quantizing means and the switching-control arrangement may comprise a further means for providing M×N switching-threshold values, said further quantizing and further switching-threshold providing means co-operating in similar manner to said quantizing means and switching-threshold providing means, said further quantizing means lacking said phase-shifting means and the outputs of said further switching-threshold providing means being additively combined with respective outputs of said switching-threshold providing means.

Alternatively, the timing-modifying means may comprise a further means for deriving a signal representative of a current flowing through said multilevel convertor and a further means for controlling a switching angle associated with each of said N outputs in accordance with said expression, said further means for deriving a signal representative of said convertor current lacking said phase-shifting means and the outputs of said further means for controlling a switching angle being additively combined with respective outputs of said means for controlling a switching angle.

To accommodate real-power transfer in the closed-loop system, the nulling means may comprise a further harmonic modulation vector means for providing, for respective ones of said N outputs, switching-threshold values relating to respective harmonics to be nulled, a further means for providing a signal representative of a magnitude of respective said harmonics to be nulled, and further combining means, said further harmonic modulation vector means, further magnitude-signal providing means and further combining means co-operating in similar manner to said harmonic modulation vector means, said magnitude-signal providing means and said combining means, said further magnitude-signal providing means comprising a plurality of 90° phase-shifters connected between respective reference-frequency generators ($f_{REF3}$, $f_{REF5}$, $f_{REF7}$) and fourth multipliers of said further magnitude-signal providing means, and the outputs of said further combining means being additively combined with the outputs of said combining means.

The multilevel convertor may be a chain-circuit multilevel convertor or a stacked-capacitor multilevel convertor.

In a second aspect of the invention, a static VAR compensator comprises a multilevel convertor and a switching-control arrangement as described above.

BRIEF DESCRIPTION OF THE DRAWINGS

Embodiments of the invention are now described, by way of example only, with the aid of the drawings, of which.

DETAILED DESCRIPTION OF EMBODIMENTS OF THE INVENTION

In a first embodiment of the invention, involving an open-loop control of switching angle, a set of theoretical characteristic angles $\theta_1$ to $\theta_N$ for the respective chain-circuit stages over a range of current from, for example, −1 to +1 per unit (p.u.) of rated current for the particular installation is derived, so as to obtain an indication of desired performance over the whole range. This may be, for example, for the purpose of obtaining zero harmonic voltage generation for a finite number of harmonics such as orders 3, 5, 7, 9; the number of such harmonics cannot exceed the number of chain links N and may in practice be selected to be smaller. Alternatively, a least-error curve-fit method may be used.

Figure 5:
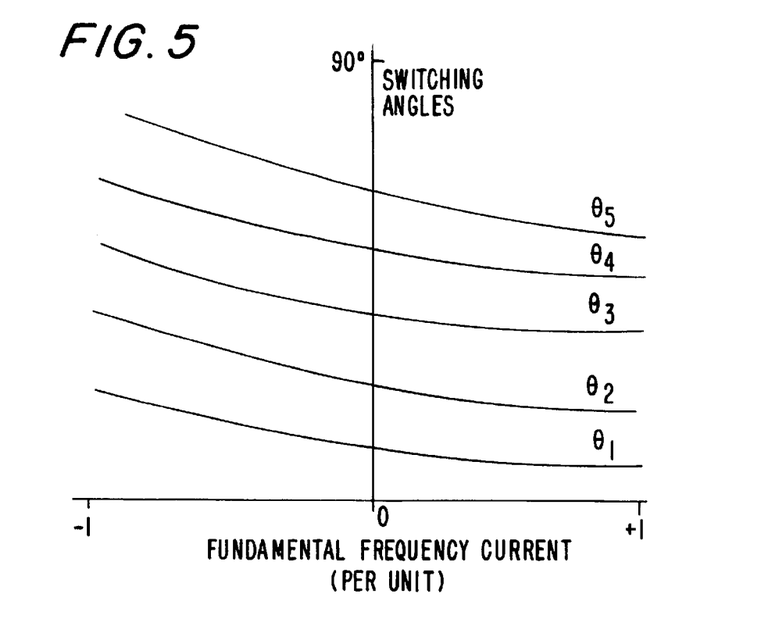
FIG. 5 is a graphical representation of the desired variation of GTO switching angle with multilevel-convertor current for each of 5 links of the convertor.

FIG. 5 shows typical results, plotted as a graph, for a 5-link chain.

In this first embodiment, illustrated in FIG. 6, the single-column, N-row look-up table 20 of FIG. 4C is replaced by an M-column, N-row table 50 whose N outputs feed respective comparators 30 as before via respective digital adders 52, the function of which will be described later. The look-up table 50 contains a set of vectors (expressed for convenience as a matrix) calculated at small intervals of fundamental current over the working range. Here it is assumed that the current range −1 p.u. to +1 p.u. is subdivided into 4001 current steps, so that look-up table 50 comprises 4001 columns (M=4001).

To provide the column-select input for the look-up table 50 a signal is first provided by a block 60 which is a function of the magnitude of the current in the chain, this signal being subsequently quantized in a block 80. Supplying the block 60 are signals representing respectively the current I passing through the chain and the voltage V CH appearing across the chain. The current I is supplied from a current transformer 61 with a burden resistor 62, and the chain voltage $V_{CH}$ from a voltage transformer 63. These signals are applied to analogue-to-digital converters 64, 65 to form digital signals. The digital signal from converter 65 is first phase-shifted by 90° (66) and multiplied by the digital signal from converter 64 in a multiplier 67. The output of the multiplier 67 is smoothed by a low-pass filter 68 to form a DC signal proportional to reactive power (VAr). The resulting signal is substantially proportional to current, neglecting AC voltage changes, and has sign sensitivity; the current signal is assumed to be positive for leading current, negative for lagging. Ignoring components 69 to 71 for the present, this signal is applied to a quantizer 81 in block 80. Quantizer 81 converts the signal at its input to the nearest value in a quantized set of 4001 integer numbers ranging from −2000 for fundamental-frequency current I=−1 p.u. to +2000 for I=+1 p.u. The output of the quantizer passes to an adder 82 which increments the quantizer output by 2000, producing a quantized output of 0 to +4000 over the normal range of current. This is arranged as the column address applied to look-up matrix/table 50.

Neglecting changes to the fundamental-frequency voltage across the chain, $V_{CH}$, the switching pattern presented to the GTO gates then changes according to fundamental current in a manner which, with appropriate programming of the look-up table (using, for example the information embodied in the graph of FIG. 5), can be arranged to give nearly optimum switching pattern at all currents.

In practice, however, it can be shown that, even at a fixed fundamental-frequency current I, the optimum pattern depends also on the reciprocal of the fundamental-frequency rms value of $V_{CH}$, which can change substantially according to working conditions. This effect is corrected by components 69 and 70. Multiplier 69 forms a signal proportional to $V_{CH}^2$ and any ripple on this signal is removed by low-pass filter 70. Divider 71 then presents a signal at its output proportional to:

$$\frac{VI}{V^2} = \frac{I}{V} \tag{2}$$

This is defined as I', the 'modified' current signal and gives the desired correction to the address to the look-up table.

The principal disadvantages of this first embodiment of the invention are the lengthy calculations required to generate the look-up table during design, and the fact that the firing pattern changes in small but possibly significant jumps as fundamental current changes. To obviate these drawbacks, a second embodiment, also an open-loop implementation, employs a simplified approximation to the required modified timing-pattern.

This second embodiment is based on the recognition that in FIG. 5 the graphs of switching angles against current are curved, but relatively smooth. A reasonable approximation for a particular switching angle, say $\theta_1$, is therefore given by:

$$\theta_1 = \theta_{01} + a_1 I' + b_1 I'^2 \tag{3}$$

where $\theta_{01}$=switching angle at I=0, a, b are constants, and

I'=I/$V_{CH}$='modified' current signal as above.

In general, the values of $\theta_1$, $\theta_0$, a and b are different for each link, as seen in FIG. 5, and may be characterized by subscripts 1 to N. Their values can be obtained by mathematical interpolation during design, between only three points for each link in each graph, calculated for example at current I=−1, 0, and +1 p.u.

This second embodiment, then, (see FIG. 7) modifies the first by employing a new look-up table 85 with only three single-column vectors, each of N numbers, for $\theta_0$ a, and b, respectively, for the N links. The modified functions of FIG. 7 are then inserted between the output of the block 60 and the input of the comparators 30 in FIG. 6, replacing components 50, 81 and 82 in FIG. 6, again ignoring adder 52 for the present. The modified functions of FIG. 7 as compared with FIG. 6 are performed by the blocks 90, individually identified as 90-1 to 90-N, in conjunction with a common multiplier 86 serving all the blocks 90. Each block 90 comprises a pair of multipliers 91, 92 and an adder 93, and the blocks 90 and multiplier 86 are configured as shown to solve equation (2) to give the appropriate signals to comparators 30 to form the N switching times $\theta_1$ to $\theta_N$ at the GTO gates as before.

This method as shown is a second-order approximation and is accurate only at the three interpolation points, providing the desired performance at these points—for example giving the desired harmonic nulls—but is inaccurate at fundamental-frequency currents between these points. This effect is generally small, but it can be reduced by employing a higher-order approximation such as 3rd or 4th, using more interpolation points and more multiplications and additions according to normal mathematical rules. The general expression employed will then be:

$$\theta_n = \theta_{0n} + \sum_{i=1}^{q} P_{ni}(I')^i \quad (4)$$

where $P_{ni}$ is a constant and q has a minimum value of 2 and a maximum value of, say, 4, though the maximum value may be higher if desired.

Open-loop controls as above give a fast response time but, as for most open-loop systems, may be relatively inaccurate, being subject to errors unknown in the design stage such as manufacturing tolerance (errors) in DC capacitors, variable switching-time delays in GTOs, the effect of harmonics originating in the emf of the AC system, and also the errors due to relatively coarse interpolation (applies to the second embodiment). These can all cause the generation of small extra harmonic voltages, and consequently currents, by the chain. These small voltages/currents may be acceptably small in some cases, but not in others.

A case where these harmonics would cause problems is where a resonance existed between a shunt capacitor bank (not shown in FIG. 1) which may be used with the chain circuit to supply extra leading VAr, and a finite AC system impedance (also not shown). If this resonance happens to lie at a frequency near to that of a finite harmonic voltage developed by the chain, then the effects of this may be magnified at the AC system busbar and may exceed permissible harmonic limits. A similar effect may occur at higher frequencies due to the presence in AC systems of normal line capacitances and inductances, even without the use of local capacitor banks.

All such effects can be reduced at the AC busbar by the addition of dedicated harmonic filters, but this incurs a cost penalty. An alternative measure is to employ, as in a third embodiment of the present invention, a closed-loop control arrangement which reduces the residual harmonics to small or zero values by negative feedback.

Figure 8:
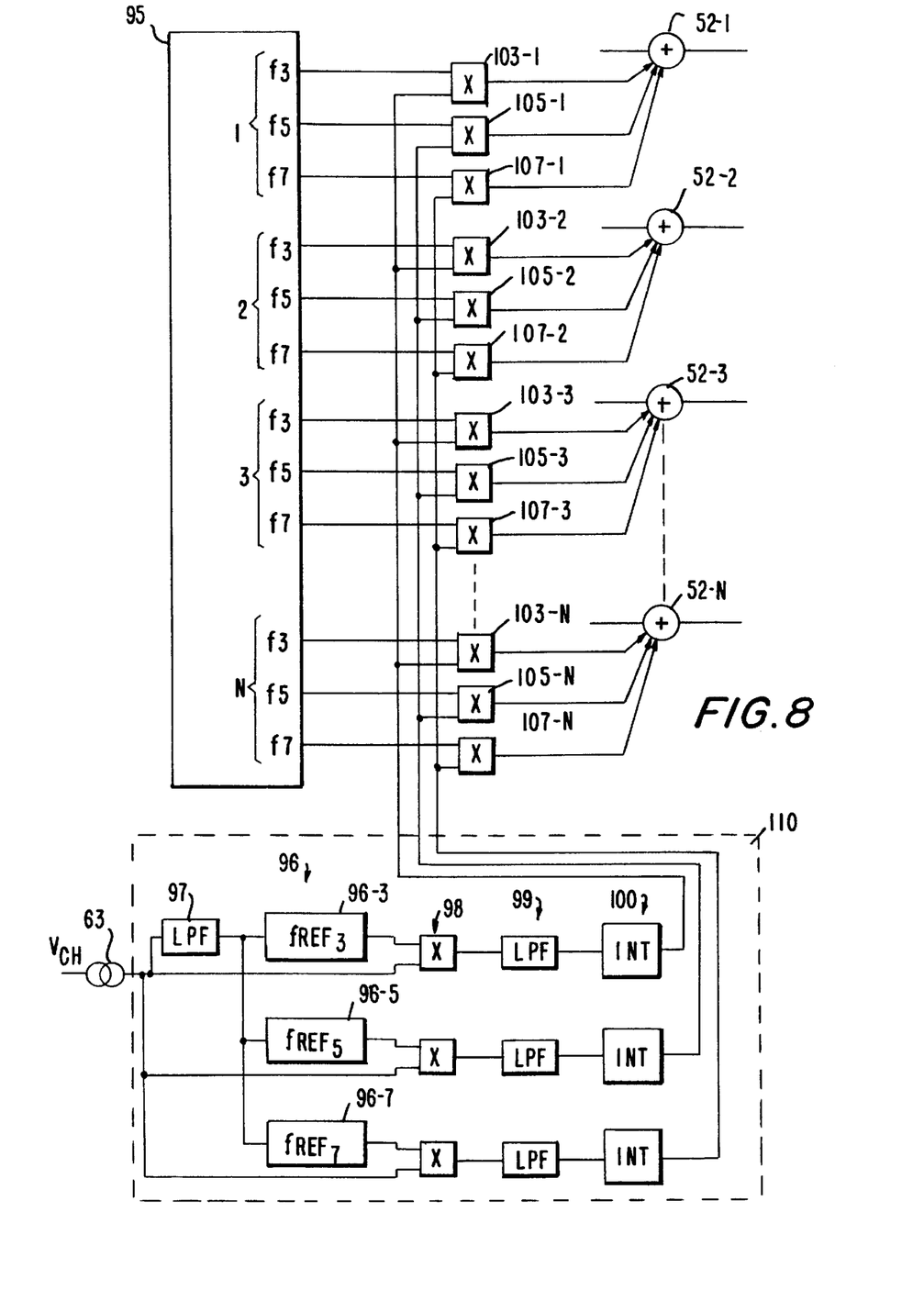
FIG. 8 illustrates a third embodiment of the switching-control arrangement according to the invention.

FIG. 8 shows an example of such a closed-loop control for nulling three specific harmonics (3rd, 5th and 7th as an example). This is a 'Fourier' method since it is based on a measurement of the particular harmonic by Fourier series integration. For this purpose a reference sine wave is required at the relevant harmonic frequency. The generation of this is not shown in detail but may be conventionally formed by a digital or analogue phase-locked oscillator system or by other methods. This is shown as a respective block 96 and is assumed to be phase-locked to the same absolute phase as the fundamental-frequency voltage of the chain, as derived by way of the voltage transformer 63 via a low-pass filter 97.

The reference sine wave leaving the reference oscillator 96 is multiplied by the chain voltage from the voltage transformer 63 by means of a respective multiplier 98, then filtered by a respective low-pass filter 99 to give a relatively pure DC signal proportional to the 3rd, 5th and 7th harmonics, respectively, in the chain voltage. This signal passes to the control integrator 100 for the respective loop.

From the output of, say, integrator 100-3 a set of N modulation signals, i.e. one per chain link, is generated, derived from a vector of N numbers stored in a 'harmonic modulation' look-up table 95 (separate to tables 50 or 85) via multipliers 103-1 to 103-N. The outputs of multipliers 103-1 to 103-N are added via adders 52-1 to 52-N, respectively, shown in FIG. 6 or 7 to change (modulate) the signals entering the respective comparators 30 and thereby change all the switching times.

A similar arrangement applies also to the other harmonics which it is desired to null, namely, in the embodiment as shown in FIG. 8, the 5th and 7th harmonics.

The harmonic modulation vector of N numbers is pre-calculated for the system, using the normal mathematical methods of sensitivity theory, by multi-variable partial differentiation of the equations for harmonic voltages as explained below. The purpose of this is to ensure that as far as practicable the particular relative proportions of modulation (angle changes in the various links) cause a change in the magnitude of the harmonic in question, e.g. the 3rd, and not of the other harmonics. Thus, if S is assumed to be the step voltage for a particular link (i.e. the step amplitude in AC voltage at time instants $-\theta$, $+\theta$, etc. in FIG. 2), an equation can be drawn up which sets the extra 3rd harmonic voltage generated by the chain to an arbitrary small value, say 0.01 p.u., this equation being:

$$\sum_{u=1}^{N} S_u \left( \frac{2\sqrt{2}}{n_0 \pi} \right) \delta_u \sin(n_0 \theta_u) = 0.01 \quad (5)$$

where $\delta_u$ is the required angle modulation for link reference u and the subscripts u for $\delta$, S and $\theta$ take on values of 1, 2, 3, ... N for the whole chain, and $n_o$=3 in this example. This is a single linear equation with N variables $\delta_1$ to $\delta_N$.

Other equations can be made by replacing no by 5, 7, 9 ... as far as practicable (in the embodiment shown in FIG. 8, by 5 and 7), each of these with the number 0.01 replaced by zero. The complete set forms a system of simultaneous linear equations with $\delta_1$, $\delta_2$, ... $\delta_N$ as variables, and other quantities fixed for a given operating condition. Since equ. (3) and the other equations are based on partial differentiation at the particular working point, they are theoretically valid only for infinitesimally small changes of the switching angles.

For N equations, their solutions give a unique set of harmonic modulation coefficients $\delta_1$ to $\delta_N$. These are stored as the harmonic modulation vector in look-up table 95. Fewer than N equations may be used (fewer harmonics in the group) but valid solutions for $\delta$ can still be obtained. (There are in this case an infinite number of solutions but any of these is in principle suitable).

In normal operation, the existence of a finite 3rd harmonic, say, in the chain voltage causes the output of integrator 100-3 to change such as to modulate the GTO switching angles to reduce the 3rd harmonic content while, in theory, not affecting the other harmonics; the control loop comes to rest with zero 3rd harmonic and with the integrator output (and modulations) at finite constant values.

In practice, as shown in FIG. 8, several such harmonic control loops will usually be required to reduce harmonic components at other frequencies also (e.g. orders 5 and 7). The control loop for the 5th harmonic is constructed similarly to that for the 3rd harmonic, except that the reference oscillator 96 is tuned to the 5th harmonic, and a separate vector of numbers for the 5th harmonic is included in harmonic modulation table 95. An analogous situation obtains for the 7th harmonic in the example shown. These numbers are calculated as before, but putting $n_o$=5 (or 7) in equation 3 and successively 3 and 7 (or 3 and 5) in the others. Separate multipliers 105-1 to 105-N and 107-1 to 107-N are required, with their outputs added into respective adders 52-1 to 52-N.

A group of several such harmonic control loops can be constructed similarly to null a group of harmonic orders 3, 5, 7, 9, . . . (or some other group of harmonics such as 5, 7, 11, 13 . . . if preferred). The look-up table 95 then becomes a group of vectors, i.e. a matrix, and is defined as a 'harmonic modulation matrix'. The various loops will act together to jointly modulate the switching angles to reduce all the relevant harmonics to zero. Although, as mentioned above, the set of equations above is theoretically valid only for infinitesimally small changes, this behavior is found to occur even for substantial initial errors.

In principle, the solutions to the equations given above for calculating the harmonic modulation matrix depend, as in the open-loop embodiments, on the basic working condition of the chain, i.e. on its fundamental-frequency voltage and current, though it is possible in this embodiment to base the harmonic modulation matrix on zero-current values only. This is because it has been found in practice that, if the matrix is calculated from equation (3), which is ideally for zero fundamental-frequency current only—although it is then in general an approximation even for small changes— these control loops, in spite of their interaction, will settle together to null the relevant harmonics for fundamental-frequency current over the normal range of −1 p.u. to +1 p.u. of rated current.

Although the various embodiments of the invention have been illustrated as digital realizations, it is possible alternatively to employ analogue techniques to arrive at the same result. Thus, in the first and second embodiments for example, the analogue-to-digital convertors 64, 65 would be omitted and the look-up tables would be replaced by sets of pre-determined analogue voltages or currents, as shown in FIG. 4B in connection with the known switching control technique.

Although the closed-loop harmonic control has been described as taking its principal measured signal input from the chain circuit voltage $V_{CH}$, so that it nulls selected harmonics in this voltage, the signal input may alternatively be derived from the current flowing through the chain, or from a point in the AC system such as the local AC busbar voltage at the point where the chain is coupled to the AC system.

If prospective harmonics due to errors are relatively small, the use of open-loop controls only may be adequate, which then yields the fastest overall response to transients. In this instance, the adders 52 (see FIGS. 6 and 7) will be dispensed with. Where errors are likely to be more significant, however, open-loop control may be employed in conjunction with closed-loop control. This takes place, as already described, by way of the adders 52 in the inputs of the comparators 30. It may be preferable in this case to limit the outputs of the control integrators 100 so as to give relatively small maximum closed-loop modulation during large transients, so that the bulk of the subsequent settling actions are fast due to the predominance of open-loop control, followed by a small slow correction through the closed-loop system to exact harmonic nulls.

It is also possible to dispense with open-loop controls altogether, in which case nominal switching angles would be employed calculated for zero fundamental-frequency current only, and the closed-loop system would be equipped with a wider output range. This is a simpler arrangement, but has the drawback of taking relatively longer to settle to a steady state condition.

The present invention is applicable not only to the multilevel chain circuit, as described, but also to the "stacked-capacitor" type of multilevel circuit, such as described in "A General Circuit Topology of Multilevel Inverter" by N. S.Choi, J. C.Cho and G. H.Cho, IEEE PESL Rec., pages 96–103, 1991.

Figure 9:
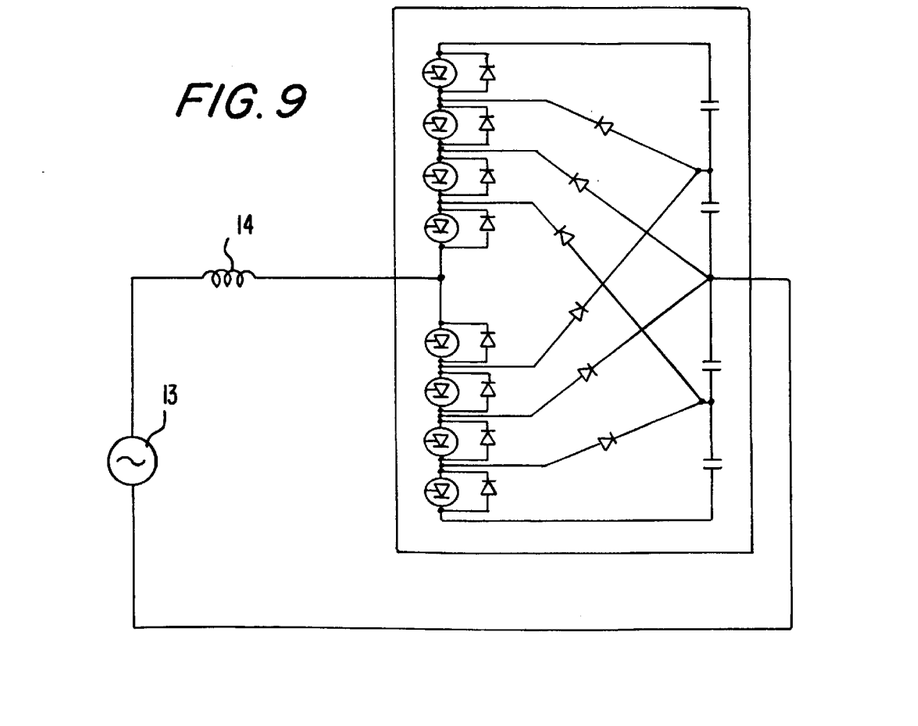
FIG. 9 is a circuit diagram of a stacked-capacitor type of multilevel convertor.

FIG. 9 gives an example of the stacked-capacitor circuit containing a plurality of capacitors stacked in series with each other, the tapping points of the capacitor stack being selectively switched onto the AC power system via a plurality of semiconductor switches. This circuit requires additional auxiliary diodes as shown. The example illustrated is mathematically similar to a 2-link chain circuit.

Both the chain circuit shown in FIG. 1 and the stacked-capacitor circuit shown in FIG. 9 are single-phase arrangements, but 3-phase versions can be constructed using three such arrangements connected in star or delta configurations.

Although the above description assumes that the multilevel chain or stacked-capacitor circuit employs capacitors on its DC side, thereby operating as a static VAr compensator (SVC), the invention also applies to these circuits when the capacitors are each replaced by an energy store such as a battery, or by individual rectifiers applied to provide DC power to each link, the rectifiers being fed from a second AC system. In the latter case the complete arrangement can operate as a controllable AC/AC coupler between the two AC systems. For this arrangement the rectifiers may be diode rectifiers or may be of the voltage-source convertor type, generally similar to the chain-link convertors described earlier. Where voltage-source convertors are used the power flow may be in either direction. Since real power as well as reactive power may flow in these cases, the open-loop switching angle control systems described (i.e. the first two embodiments) also require a second set of controls in parallel with the first set described above. The modifications for this will now be described.

Figure 6:
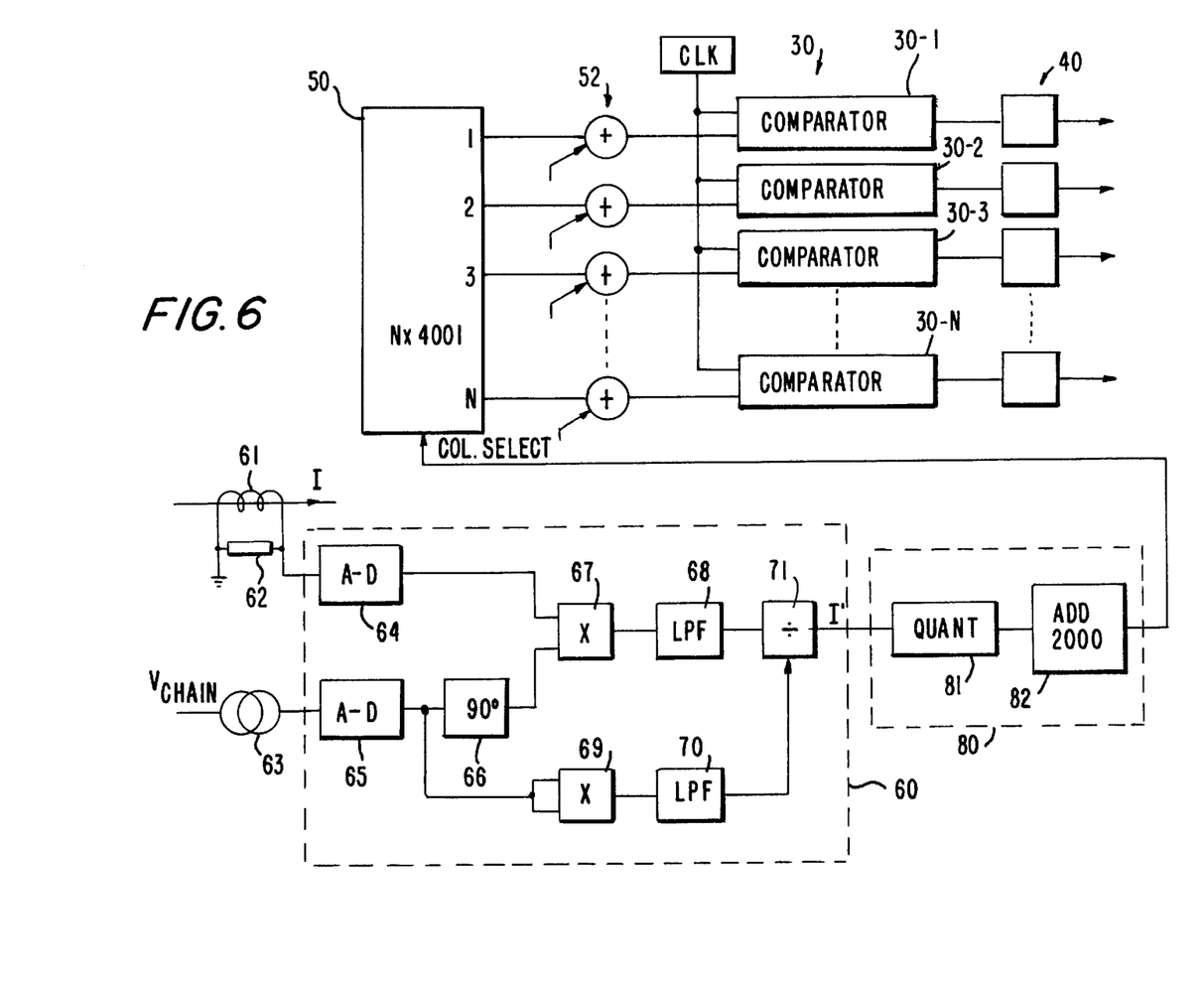
FIG. 6 illustrates a first embodiment of the switching-control arrangement according to the invention.
Figure 7:
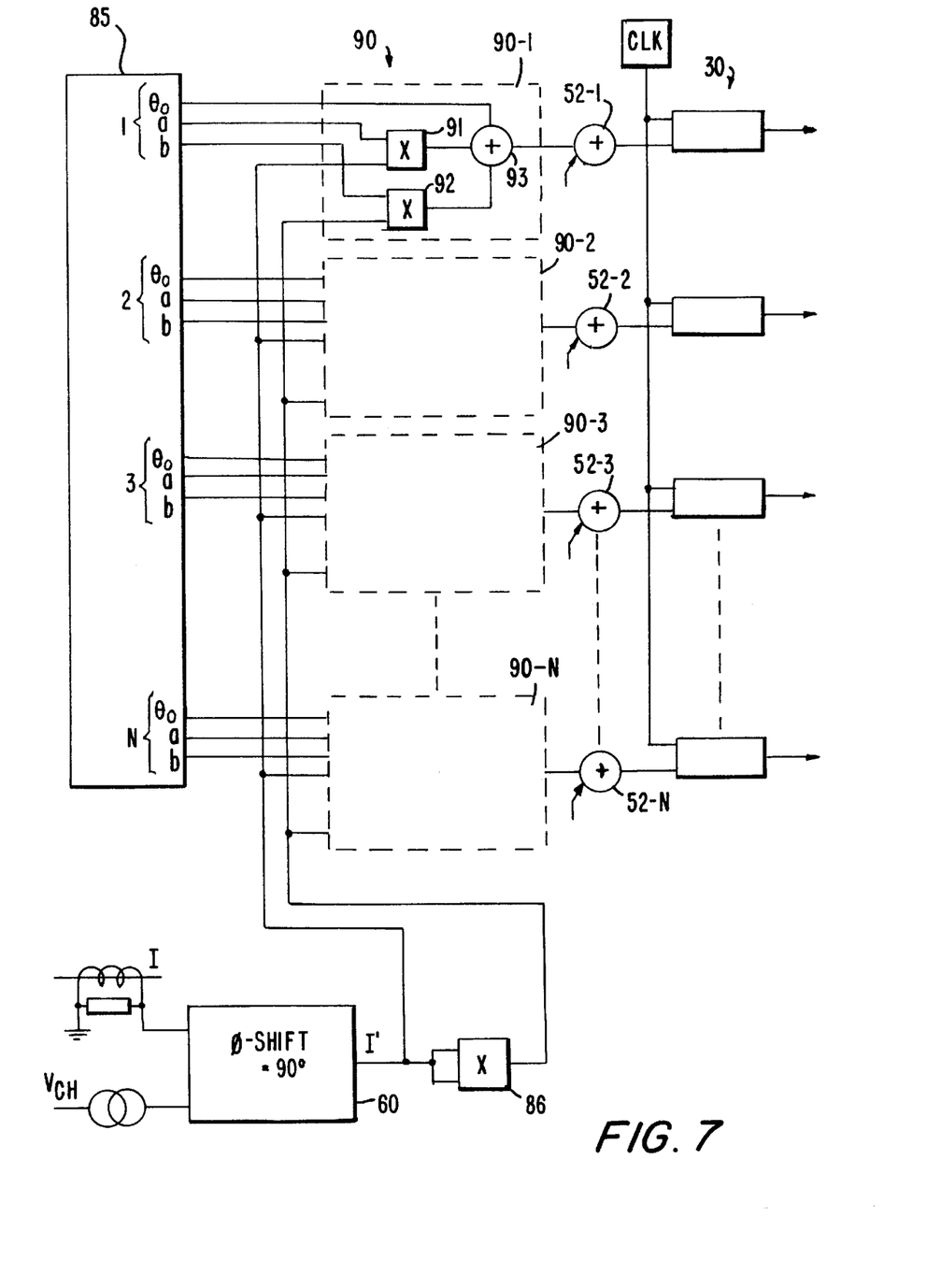
FIG. 7 illustrates a second embodiment of the switching-control arrangement according to the invention.
Figure 10:
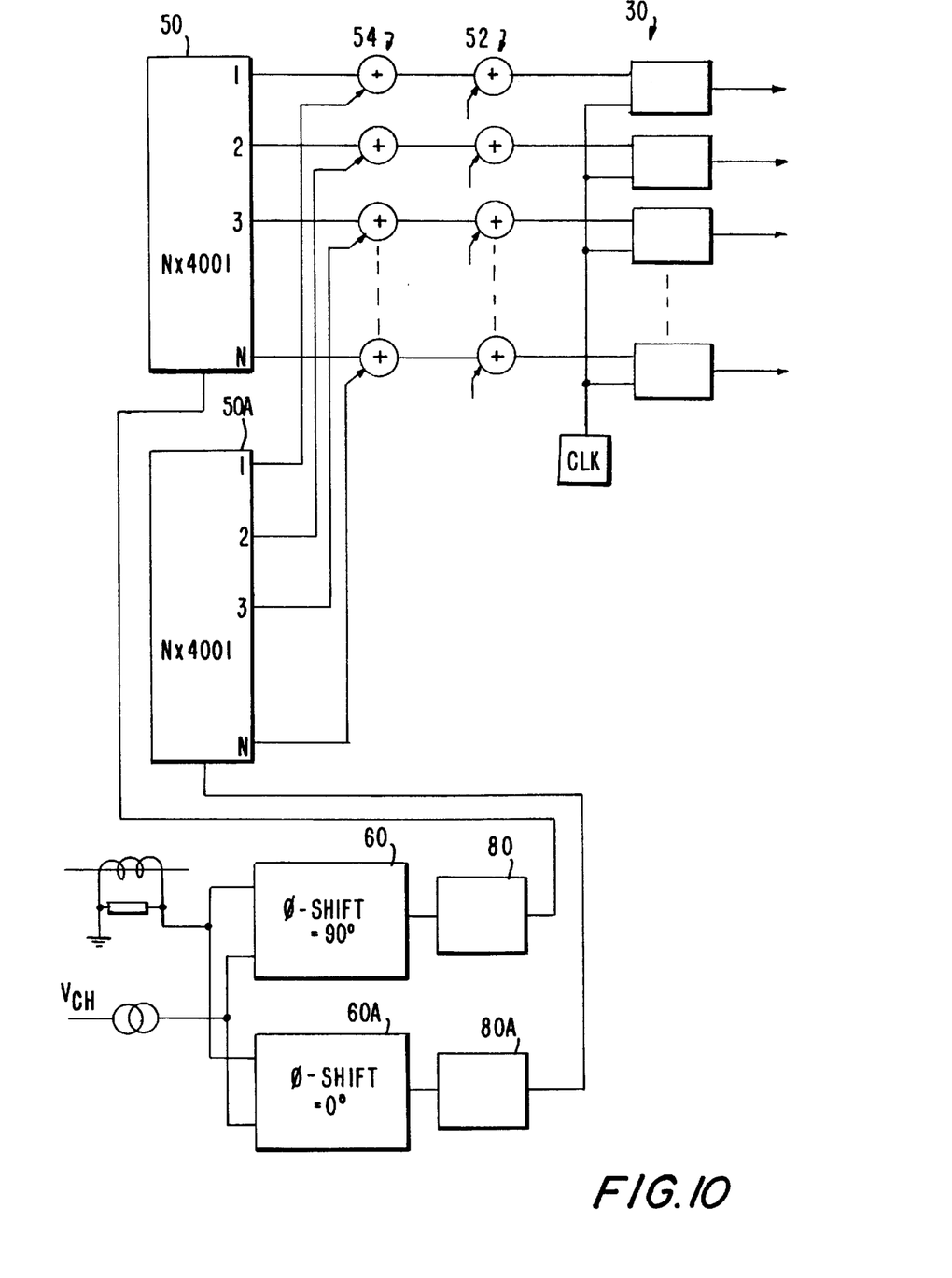
FIG. 10 is a schematic diagram of the first embodiment of the present invention modified to cope with real as well as reactive power through the multilevel convertor.

FIG. 10 shows the open-loop embodiment of FIG. 6 in which a second look-up table 50A is provided having, like table 50, N outputs which are combined with the outputs of the existing table 50 in respective adders 54. The column-select input of the second table 50A is fed from its own signal-forming and quantization stages 60A, 80A, respectively, the essential difference being that the A-D stage 65 (see FIG. 6) of stage 60A is not phase-shifted by 90° as it is in the existing stage 60.

Figure 11:
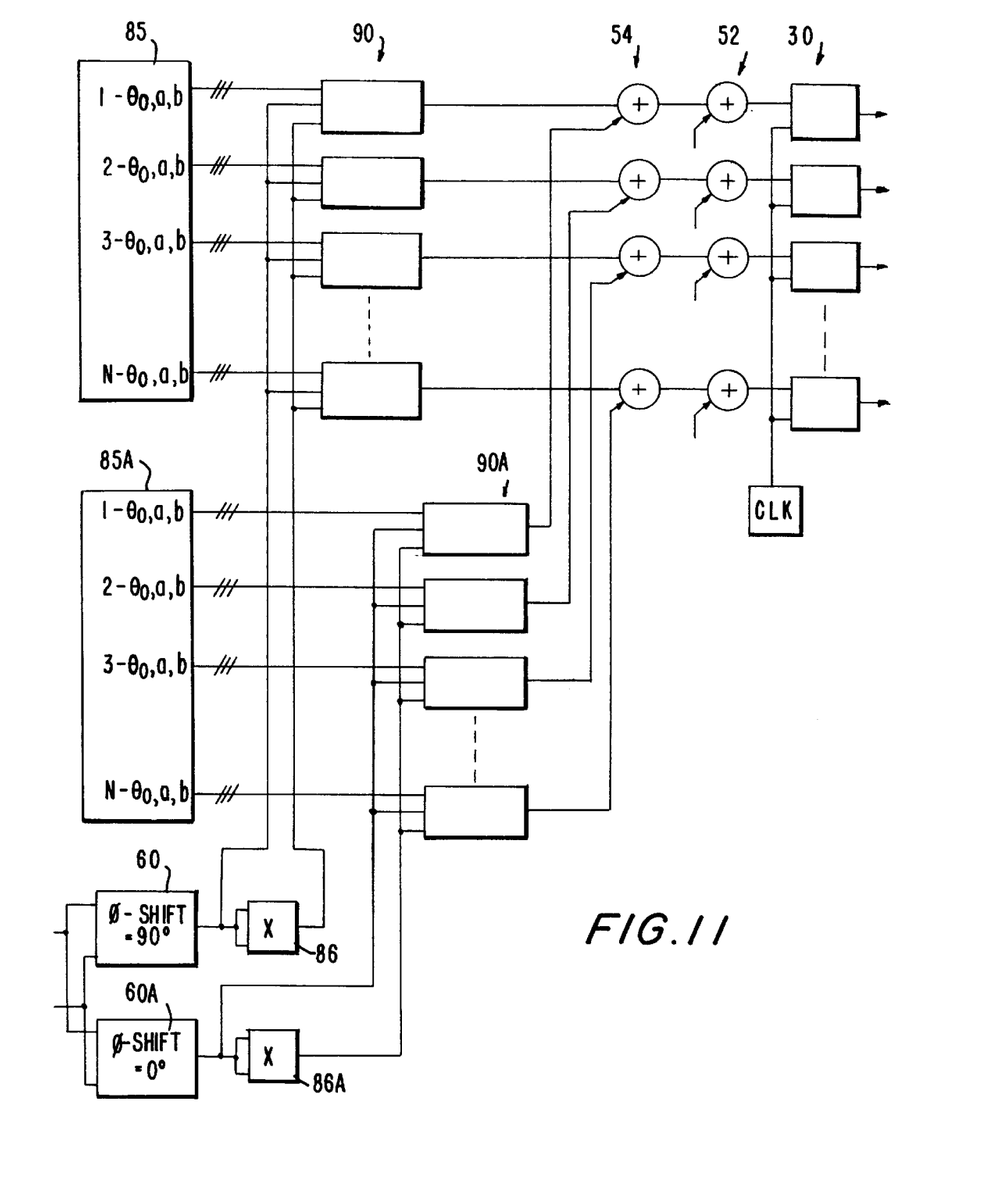
FIG. 11 is a schematic diagram of the second embodiment of the present invention modified to cope with real as well as reactive power through the multilevel convertor.

Likewise, the second open-loop embodiment (see FIG. 7) requires the addition of a second set of control components, including (see FIG. 11) a second look-up table 85A and a second signal-forming block 60A feeding a second multiplier 86A. The second table 85A (which may, for example, have the same contents as the first table 85), the signal-forming block 60A and the multiplier 86A feed second multiplier/adder blocks 90A, the outputs of which are additively combined in adders 54 with the outputs of the existing blocks 90. Again, there is no phase-shift facility in the signal-forming block 60A.

Figure 12:
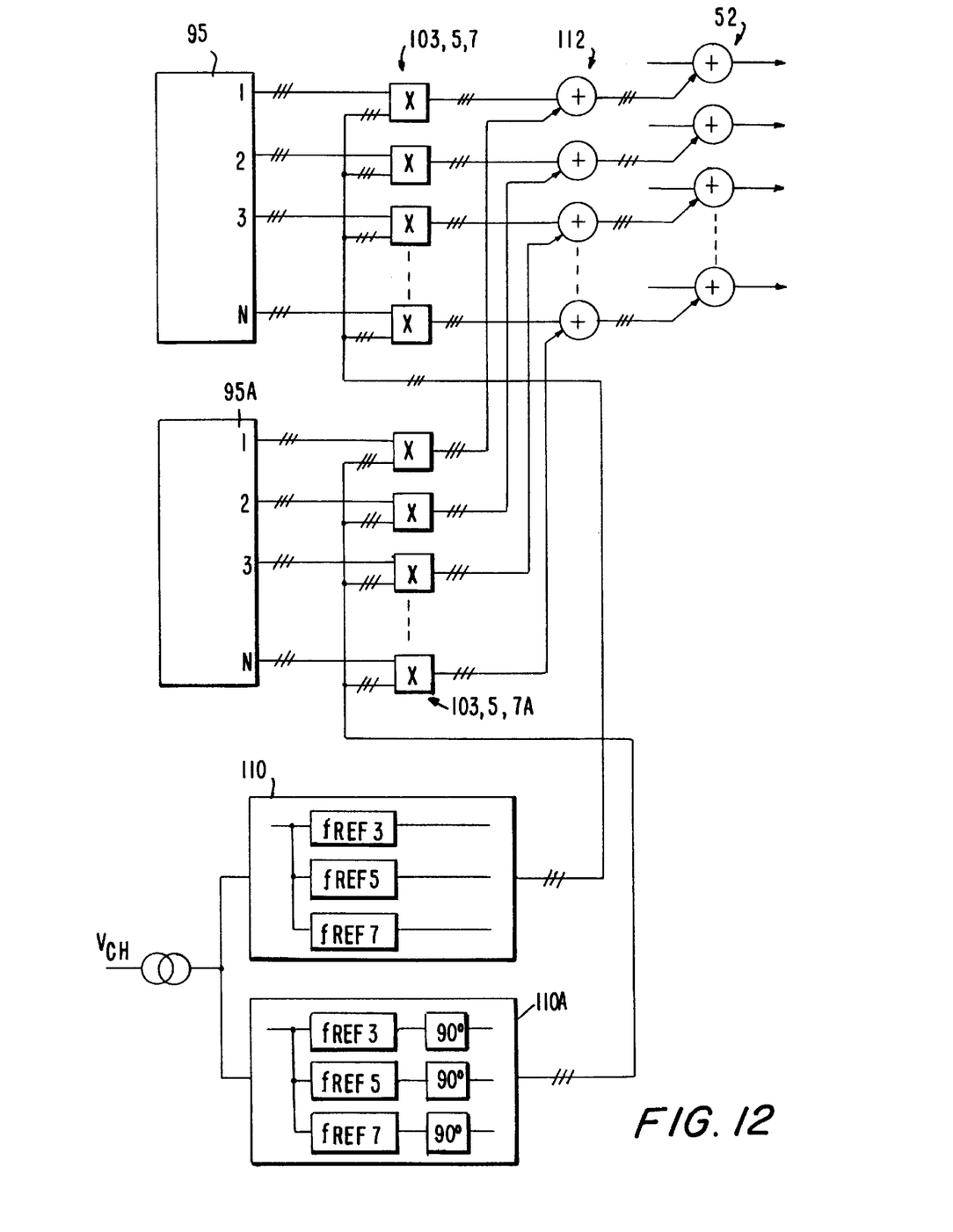
FIG. 12 is a schematic diagram of the third embodiment of the present invention modified to cope with real as well as reactive power through the multilevel convertor.

The closed-loop switching-angle control system described in connection with FIG. 8 also requires modification where real power is to be catered for. This is achieved (see FIG. 12) by the addition, as in the open-loop cases, of a second look-up table 95A, a second Fourier block 110A and further multipliers 103A, 105A ,107A for each of the N links. The outputs of the further multipliers are combined with the outputs of the existing multipliers in respective further adders 112. The second Fourier block 110A contains a phase-shifter for each harmonic to be nulled which shifts the signal provided by the respective reference oscillators 96A by 90° (i.e. a cosinusoidal rather than a sinusoidal signal).

What is claimed is:

1. A switching-control arrangement for a multilevel convertor having a plurality of DC-sink/source means, a plurality of switching devices associated with said DC-sink/source means, and a switching-pattern generating means configured to switch said switching devices in a predetermined switching pattern such as to yield at an output of the convertor a multilevel electrical signal for connection to an AC power system with which said convertor is to be used, said switching-control arrangement comprising: means for reducing harmonic corruption of the multilevel electrical signal at the output of said convertor by modifying said switching pattern to minimize an undesired harmonic content of an electrical quantity associated with said convertor or with said AC power system.

2. Switching-control arrangement as claimed in claim 1, wherein said switching-pattern modifying means comprises means for modifying a timing of the switching of said switching devices.

3. Switching-control arrangement as claimed in claim 2, wherein said predetermined switching pattern corresponds to a predetermined fraction of an amplitude of a fundamental-frequency component of convertor output current and said timing-modifying means is arranged to modify said timing in dependence on a value of said fundamental-frequency current amplitude relative to said predetermined fraction.

4. Switching-control arrangement as claimed in claim 3, wherein said switching-pattern generating means has N outputs for application to said switching devices and said timing-modifying means comprises a means for quantizing a range of the convertor output current into M different levels, said switching-control arrangement comprising also a means for providing M×N switching-threshold values, said threshold-value providing means being connected to said quantizing means such that, for a particular value of the convertor output current, a particular one of M sets of N threshold values is selected, said particular set of threshold values causing said switching devices to be switched such as to give rise to a minimum level of harmonic distortion in convertor output voltage.

5. Switching-control arrangement as claimed in claim 4, wherein said quantizing means comprises a means for forming a signal corresponding to a product of a voltage across said multilevel convertor and a current flowing through said multilevel convertor.

6. Switching-control arrangement as claimed in claim 5, wherein said quantizing means comprises a phase-shifting means for shifting one of said multilevel convertor voltage ($V_{CH}$) and current (I) by 90° prior to the formation of said product.

7. Switching-control arrangement as claimed in claim 6, wherein said quantizing means comprises also a means for dividing said product by a signal representative of said multilevel-convertor voltage.

8. Switching-control arrangement as claimed in claim 7, wherein said phase-shifting means is arranged to phase-shift said signal representative of said convertor voltage by 90° and said product-dividing means is arranged to divide said product by said signal representative of said convertor voltage.

9. Switching-control arrangement as claimed in claim 2, wherein said switching-pattern generating means has N outputs for coupling to said switching devices and said timing-modifying means comprises a means for deriving a signal representative of a current flowing through said multilevel convertor and a means, connected to said means for deriving a signal representative of convertor current and coupled to said switching devices, for controlling a switching angle associated with each of said N outputs in accordance with the following expression:

$$\theta_n = \theta_{0n} + \sum_{i=1}^{q} P_{ni}(I')^i \qquad (6)$$

where
 $2 \leq q \leq 4$
 $\theta_n$=switching angle of link n, $1 \leq n \leq N$
 $\theta_{0n}$=switching angle at zero current,
 $P_n$=constant, and
 I'=a signal representative of a fundamental-frequency amplitude of said multilevel-convertor current.

10. Switching-control arrangement as claimed in claim 9, comprising a means for providing signals representative of said parameters $\theta_{0n}$ and $P_{ni}$ for each of said N outputs.

11. Switching-control arrangement as claimed in claim 10, wherein said means for deriving a signal representative of convertor current comprises a means for forming a signal corresponding to a product of a voltage across said multilevel convertor and a current flowing through said multilevel convertor.

12. Switching-control arrangement as claimed in claim 11, wherein said means for deriving a signal representative of convertor current comprises also a phase-shifting means for shifting one of the convertor voltage ($V_{CH}$) and convertor current (I) signals by 90° prior to the formation of said product.

13. Switching-control arrangement as claimed in claim 12, wherein said means for deriving a signal representative of convertor current comprises also a means for dividing said product by the multilevel-convertor voltage signal ($V_{CH}$), the output of said dividing means being taken to an input of said switching-angle controlling means.

14. Switching-control arrangement as claimed in claim 13, wherein said switching- angle controlling means controls a switching angle associated with each of said N outputs in accordance with the quadratic expression:

$$\theta_n = \theta_{0n} + a_n I' + b_n I'^2$$

where a and b are constants and $1 \leq n \leq N$.

15. Switching-control arrangement as claimed in claim 14, wherein said switching- angle controlling means comprises first and second multipliers and an adder, first inputs of said first and second multipliers being connected to respective outputs of said parameter-signal providing means which provide said a and b constants, respectively, second inputs of said first and second multipliers being respectively connected to the output of said means for deriving a signal representative of convertor current and to an output of a means for forming a square of the signal on said output of means for deriving a signal representative of convertor current, respective outputs of said first and second multipliers being taken along with an output of said parameter-signal providing means which provides said $\theta_0$ parameter to respective inputs of said adder, an output of said adder being used to drive the respective switching-device stage.

16. Switching-control arrangement as claimed in claim 1, comprising a closed-loop switching-angle control means.

17. Switching-control arrangement as claimed in claim 16, wherein said closed-loop switching-angle control means comprises a means for nulling individual harmonics of said electrical quantity associated with said convertor or with said AC power system.

18. Switching-control arrangement as claimed in claim 17, wherein said nulling means comprises a harmonic modulation vector means for providing, for respective ones of said N outputs, switching-threshold values relating to respective harmonics to be nulled, a means for providing a signal representative of a magnitude of respective said harmonics to be nulled, and combining means connected to said harmonic modulation vector means and to said magnitude-signal providing means for combining respective harmonic-magnitude signals with respective harmonic switching-threshold values, thereby to provide respective N output signals for coupling to said switching devices.

19. Switching-control arrangement as claimed in claim 18, wherein said combining means are third multipliers.

20. Switching-control arrangement as claimed in claim 19, wherein said magnitude-signal providing means comprises a plurality of reference-frequency generators ($f_{REF3}$, $f_{REF5}$, $f_{REF7}$) for respective harmonics to be nulled, the frequency of each generator being the same as the frequency to be nulled, a plurality of fourth multipliers associated with respective harmonics to be nulled, said fourth multipliers each having first and second inputs connected to, respectively, an output of a respective said reference-frequency generator and a signal representative of said electrical quantity, and an output connected to an integrator, an output of said integrator forming an output of said magnitude-signal providing means.

21. Switching-control arrangement as claimed in claim 4 and comprising a closed-loop switching-angle control means, said closed-loop switching-angle control means comprising a means for nulling individual harmonics of said electrical quantity associated with said convertor or with said AC power system, said nulling means comprising a harmonic modulation vector means for providing, for respective ones of said N outputs, switching- threshold values relating to respective harmonics to be nulled, a means for providing a signal representative of a magnitude of respective said harmonics to be nulled, and combining means connected to said harmonic modulation vector means and to said magnitude-signal providing means for combining respective harmonic-magnitude signals with respective harmonic switching-threshold values, thereby to provide respective N output signals for coupling to said switching devices, wherein an output of said combining means is additively combined with a relevant output of said means for providing M×N switching-threshold values.

22. Switching-control arrangement as claimed in claim 9 and comprising a closed-loop switching-angle control means, said closed-loop switching-angle control means comprising a means for nulling individual harmonics of said electrical quantity associated with said convertor or with said AC power system, said nulling means comprising a harmonic modulation vector means for providing, for respective ones of said N outputs, switching-threshold values relating to respective harmonics to be nulled, a means for providing a signal representative of a magnitude of respective said harmonics to be nulled, and combining means connected to said harmonic modulation vector means and to said magnitude-signal providing means for combining respective harmonic-magnitude signals with respective harmonic switching-threshold values, thereby to provide respective N output signals for coupling to said switching devices, wherein an output of said combining means is additively combined with an output of the relevant switching-angle controlling means.

23. Switching-control arrangement as claimed in claim 21 or claim 22, wherein said combining means are third multipliers.

24. Switching-control arrangement as claimed in claim 6, wherein said multilevel convertor is capable of real-power transfer with respect to the AC power system, said timing-modifying means comprising a further quantizing means and said switching-control arrangement comprising a further means for providing M×N switching-threshold values, said further quantizing and further switching-threshold providing means co-operating in similar manner to said quantizing means and switching-threshold providing means, said further quantizing means lacking said phase-shifting means and the outputs of said further switching-threshold providing means being additively combined with respective outputs of said switching-threshold providing means.

25. Switching-control arrangement as claimed in claim 12, wherein said multilevel convertor is capable of real-power transfer with respect to the AC power system, said timing-modifying means comprising a further means for deriving a signal representative of a current flowing through said multilevel convertor and a further means for controlling a switching angle associated with each of said N outputs in accordance with said expression, said further means for deriving a signal representative of said convertor current lacking said phase-shifting means and the outputs of said further means for controlling a switching angle being additively combined with respective outputs of said means for controlling a switching angle.

26. Switching-control arrangement as claimed in claim 20, wherein said multilevel convertor is capable of real-power transfer with respect to the AC power system, said nulling means comprising a further harmonic modulation vector means for providing, for respective ones of said N outputs switching threshold values relating to respective harmonics to be nulled, a further means for providing a signal representative of a magnitude of respective said harmonics to be nulled, and further combining means, said further harmonic modulation vector means, further magnitude-signal providing means and further combining means co-operating in similar manner to said harmonic modulation vector means, said magnitude-signal providing means and said combining means, said further magnitude-signal providing means comprising a plurality of 90° phase-shifters connected between respective reference-frequency generators ($f_{REF3}$, $f_{REF5}$, $f_{REF7}$) and fourth multipliers of said further magnitude-signal providing means and the outputs of said further combining means being additively combined with the outputs of said combining means.

27. Switching-control arrangement as claimed in claim 1, wherein said multilevel convertor is a chain-circuit multilevel convertor.

28. Switching-control arrangement as claimed in claim 1, wherein said multilevel convertor is a stacked-capacitor multilevel convertor.

29. Static VAR compensator comprising a multilevel convertor and a switching-control arrangement, said convertor having a plurality of DC-sink/source means, a plurality of switching devices associated with said DC-sink/source means, and a switching-pattern generating means, said switching-pattern generating means being configured to switch said switching devices in a predetermined switching pattern such as to yield at an output of the convertor a multilevel electrical signal for connection to an AC power system with which said convertor is to be used, wherein said switching-control arrangement comprises a means for reducing harmonic corruption of the multilevel electrical signal at the output of said convertor by modifying said switching pattern to minimize an undesired harmonic content of an electrical quantity associated with said convertor or with said AC power system.

* * * * *